No. 688,537. Patented Dec. 10, 1901.
F. F. MEYER.
WEIGHING MACHINE.
(Application filed Jan. 9, 1901.)
(No Model.) 4 Sheets—Sheet 3.

WITNESSES:

INVENTOR:
FREDERICK F. MEYER
BY
Fred'k Fraentzel,
ATTORNEY

United States Patent Office.

FREDERICK F. MEYER, OF NEWARK, NEW JERSEY.

WEIGHING-MACHINE.

SPECIFICATION forming part of Letters Patent No. 688,537, dated December 10, 1901.

Application filed January 9, 1901. Serial No. 42,609. (No model.)

*To all whom it may concern:*

Be it known that I, FREDERICK F. MEYER, a citizen of the United States, residing at Newark, in the county of Essex and State of New Jersey, have invented certain new and useful Improvements in Weighing-Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates generally to improvements in automatic weighing-machines for the weighing or measuring of grain and other materials; and the invention has for its principal object the provision of a simply-constructed weighing machine or apparatus comprising in the embodiment thereof operative and highly efficient mechanism for correctly weighing or measuring the desired quantities of grain or other material.

A further object of this invention is to provide, in connection with the various mechanism of an automatic weighing-machine, an operating means for causing the grain or other material to be emitted from the balanced measuring-receptacle of the apparatus automatically after a desired quantity has been weighed or measured.

A further object of this invention is to provide, with the weighing mechanism of the machine, an auxiliary weight, which may be termed the "dribble-weight," and which acts to finally close the discharge-opening in the delivery hopper or pocket, which has been left partially open after the larger quantity of the grain or other material has been delivered into the weighing or measuring receptacle of the machine to produce the correct weight or measurement of the grain delivered and also to prevent any possible escape and consequent loss of grain while the measured material is being automatically discharged after the desired quantity has been secured.

The invention consists in the novel weighing or measuring machine or apparatus to be hereinafter fully set forth; and, furthermore, my invention consists in the several features of novelty, as well as in the details of construction and the various combinations and arrangements of parts, all of which will be more particularly described in the accompanying specification, and then finally embodied in the clauses of the claim, which form a part of this specification.

The invention is fully illustrated in the accompanying drawings, in which—

Similar characters of reference are employed in all of the said above-described views to indicate corresponding parts.

Figure 3:
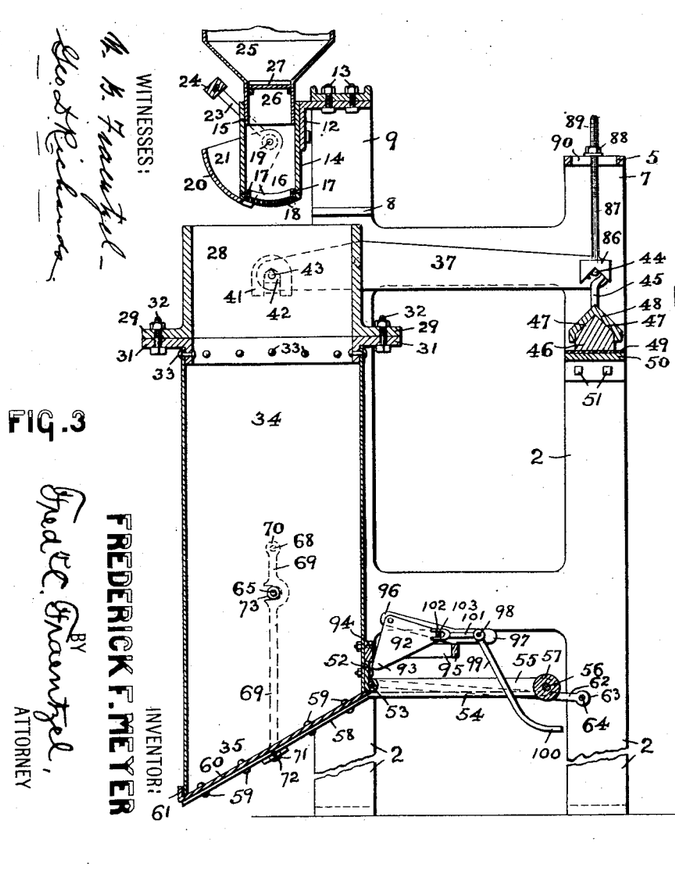
Fig. 3 is a longitudinal vertical section of the apparatus, said section being taken on line 3 3 in Fig. 2.
Figures 7, 8:
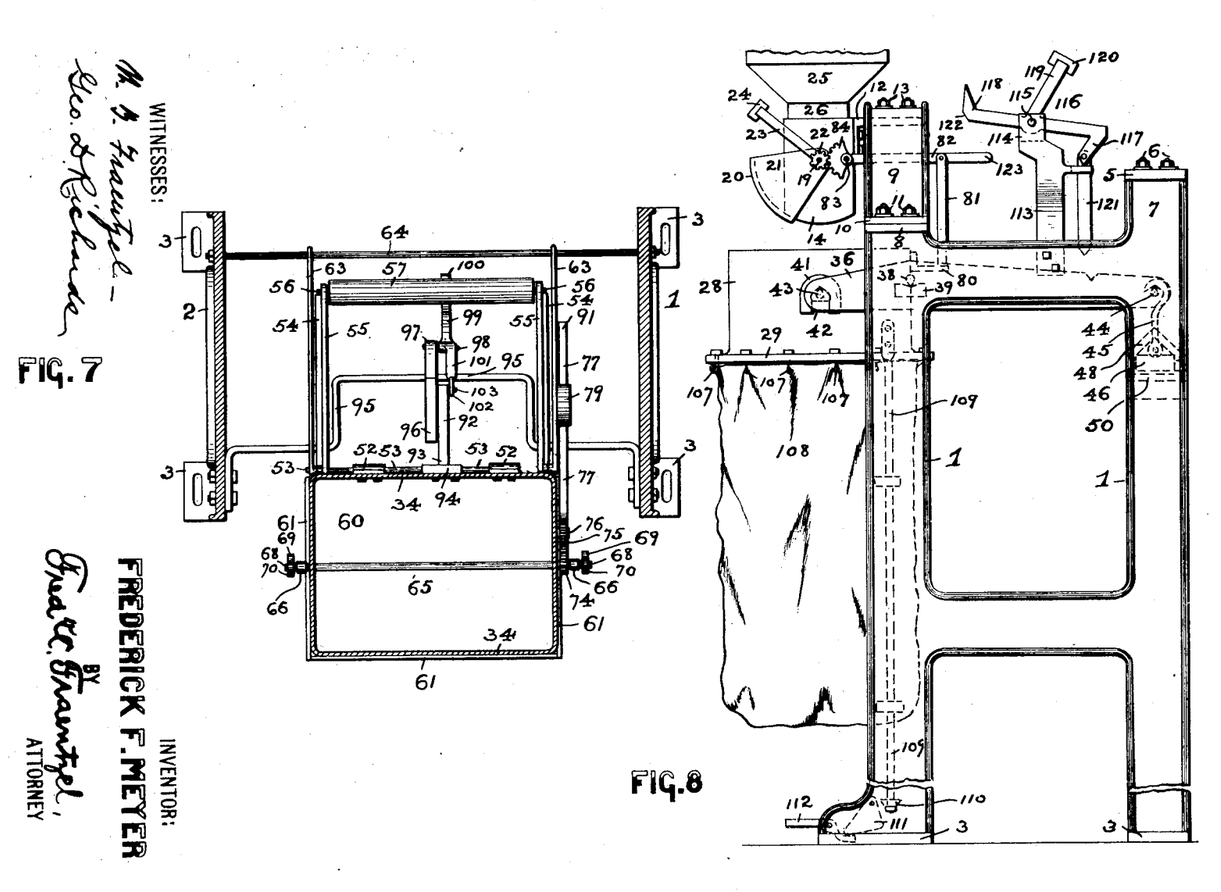
Fig. 7 is a similar section of the machine, said section being taken on line 7 7 in said Fig. 1.
Fig. 8 is a side view of a weighing or measuring machine of a modified construction, but still embodying the principles of this invention, the weighing or measuring apparatus in this instance being employed as a bag-filling machine.

The framework for carrying the working parts of the machine is preferably that illustrated in the several figures of the drawings, the same consisting, substantially, of a pair of side frames or standards 1 and 2, preferably provided at the bottom with laterally-extending flanges, as 3, for securing the said frames or standards in position upon the floor or upon any other part of the framework or scaffolding of a mill or the like. Each frame or standard 1 and 2 is provided at or near the one end with an upwardly-extending portion 7, provided at the top with inwardly-extending shoulders or projections 4, to which is secured, by means of bolts or screws 6 or in any other suitable manner, a brace or cross-bar 5. Near the forward end portions of each frame or standard 1 and 2 the said frames or standards are each provided with a supporting portion 8, forming inwardly-extending shoulders or projections for the flanges 10 of a suitably-constructed yoke or frame 9. This yoke or frame 9 may be secured upon the said supporting portions 8 by means of screws or bolts 11, substantially as shown; but of course it will be understood that any other means of connecting these parts may be employed. Suitably secured in position to this yoke or frame 9 by means of bolts or screws 13 or otherwise is a bracket 12. This bracket carries a receiving-bucket 14, which has an open top 15 and an open bottom 16, substantially as illustrated in Fig. 3 of the drawings. Surrounding the inner marginal edge of said bottom 16 is a suitably-constructed frame 17, which has a central open portion, substantially as shown, and is provided with downwardly-projecting bristles 18, of wire or other suitable material, adapted for brushing-off purposes. The said bucket 14 is provided in its opposite sides with a pair of outwardly-projecting pins or pivots 19, forming journals, on which I have arranged, so as to oscillate thereon, the side pieces 21 of a swing gate or valve 20 for opening and closing the bottom of the bucket 14 in the manner and for the purposes hereinafter more fully set forth. The said gate 20 and its side pieces 21, as will be seen more especially from an inspection of Fig. 3, practically form a stirrup, which embraces the lower curved edges of the bucket 14, while the inner curved surface of the said gate 20 can be brought in close brushing contact with the bristles 18, substantially as shown, for removing all particles of grain or other material, and thereby provide for the proper closing of the gate or valve of the bucket 14. On one of the said pins 19 is secured a pinion 22, and attached to the said side pieces 21, or, if desired, to the pins 19, are a pair of forwardly-extending arms 23, having a connecting-piece 24, which forms a counter weight or balance and causes said gate 20 to close the bottom of the bucket when the grain-receiving receptacle of the apparatus has received the desired quantity of matter to be weighed or measured. Within the opening 15 of said bucket 14 can be arranged the throat 26 of an ordinary grain-chute 25, the same being provided with the usual hand slide or valve 27 to be opened when the apparatus is to be used for delivering grain or other matter to be weighed or measured first into the delivery-bucket 14 and then into the weighing or measuring receptacle beneath said bucket. This weighing or measuring receptacle consists, essentially, of an upper casing or frame 28 and is provided with a flange 29, that surrounds the lower portion of the same. To this flange 29 is secured, by means of screws or bolts 32 or in any other manner, a flange 31 of a lower frame 30, and to this lower frame 30 is secured, by means of rivets 33 or otherwise, a shell 34, which is provided in the bottom with a delivery-opening 35. This arrangement of parts comprises the weighing or measuring receptacle of the machine and is the preferred construction, the same being made of metal and of the desired weight; but it will be understood that said parts are not necessarily made of metal and the said receptacle may be made in one piece and may be of any desired configuration and shape, as will be clearly evident. This receptacle is supported between a pair of parallel beam-arms 36 and 37, each of which is provided with a knife-edge 38 for operatively pivoting each arm in the receiving or bearing portion of a fulcrum or shoe 39, arranged in corresponding positions on the inner surfaces of the said frames or standards 1 and 2 of the apparatus, as clearly indicated in Figs. 1, 2, 6, and 7. The fulcrums or supporting-shoes 39 may be cast directly upon the sides of said frames or standards 1 and 2, as illustrated in Fig. 7, each shoe having a bearing or receiving portion 40 for the pivotal support of a knife-edge 38, as clearly illustrated.

The weighing or measuring receptacle is sustained between the forward end portions of the two beam-arms 36 and 37 by having the upper casing or frame 28 formed on its outer surfaces with fulcrums or shoes 41, each having a bearing or receiving portion 42, by means of which the frame or casing 28 is operatively and perfectly suspended upon a knife-edge 43 at or near the forward end of each beam-arm 36 and 37, substantially in the manner illustrated in the several figures of the drawings, and the arrangement of the weighing-receptacle between said beams 36 and 37 is such that the position of the center of gravity of said receptacle causes the simultaneous tipping of the said beams 36 and 37 and prevents any tipping of the one before the other.

When empty, the weighing or measuring receptacle is counterbalanced by the longer lever-arms of the two beams 36 and 37, each arm having a knife-edge 44, and on each side is a link or hooked rod 45, suspended from said knife-edges 44, as shown. To these rods 45 is pivotally or otherwise attached at their lower ends a poise or weight 46, the main purpose of which is to maintain the proper equilibrium or balance of the several parts of the weighing-machine when inactive. This poise or weight 46 is preferably made as shown, being formed with the Λ-shaped upper surfaces 47 for the support thereon of the desired weight or weights 48, which weights may be of different denominations, according to the quantity of grain or other matter to be weighed or measured. When the several parts of the weighing-machine are in their normal and inactive positions, (indicated more particularly in Figs. 1, 2, and 3,) then the poise 46 and its weight 48 will rest upon a rubber or other suitable cushion or pad 49, arranged upon a bar or brace 50, which is suitably secured between the main frames or standards 1 and 2 by means of the screws or bolts 51.

Secured in any well-known manner against the back of the section 34 of the weighing or measuring receptacle and near the edge of the lower discharge-opening 35 are suitably-disposed hinge-plates 52, in the eye portions of which is a rod 53. Pivotally supported at or near the ends of said rod 53 are a pair of rearwardly-extending arms 54, each arm being provided with a rib 55, so as to form an L in cross-section, and thereby provide great strength and rigidity for the support. At the rear of said arms 54 and arranged between the said arms 54 is a rod 56, on which is a counter weight or balance 57. The forward end portions 58 of the said rods or arms 54, which are devoid of the ribs 55, extend directly beneath the bottom of the weighing or measuring receptacle and have secured thereto by means of rivets 59 or in any other suitable manner a closing gate or door 60. The normal tendency of the said counter weight or balance 57 is to produce an upward movement of the said gate or door 60, thereby causing said gate or door 60 to close the discharge-opening 35 of the weighing or measuring receptacle, with a surrounding flange 61 of said gate or door embracing the outer surrounding parts of the said receptacle, as illustrated, to prevent leakage of the grain or other material while filling the receptacle. To obviate any undue lateral swinging motion of the weighing or measuring receptacle and the parts connected therewith, the rod 53 has secured thereto a pair of rearwardly-extending links or rods 62, each rod being provided at the rear end with an eye 63, which is arranged on a rod 64, extending laterally between the rear portions of the frames or standards 1 and 2. These rods 62 are so arranged that any excessive and laterally-swinging motion of the weighing or measuring receptacle will be fully overcome; but the vertical motion during the filling and weighing or measuring operations is not in the least interferred with.

The lower section 34 of the weighing or measuring receptacle is provided in its sides with oppositely-placed and outwardly-extending pins or journals 65, to each of which is fixed an upwardly-extending arm or link 66. Pivotally connected with the upper eye 67 of each arm or link 66 by means of a pivot 68 is the eye 70 of a downwardly-extending supporting-link 69, the lower eye portion 71 of each link 69 being pivotally secured, by means of a bearing or pin 72, to the bottom gate or door 60, substantially as illustrated. Each link 69 is provided with a recessed or cut-away portion 73, whereby when the gate or door 60 is closed against the bottom of the weighing or measuring receptacle said portions of the links 69 will extend around the pivots or journals 65 and the links will be in proper vertical and central alinement with the central axis of the section 34, and hence will not obstruct the proper closing of the bottom in said section by the door or gate 60. On one of the said pivots or journals 65, in the present case upon the right side of the casing or section 34 when viewed from the front of the machine, is suitably secured a toothed pinion 74. In mesh with said pinion is a toothed sector 75, the latter being secured on a pivot or journal pin 76, which extends from the side of the section 34. The said sector is provided with a rearwardly-extending arm or lever 77, which has its rear end under normal conditions extending just above a lug or bracket 78, projecting from the inner side of the frame or standard 1, substantially as illustrated. A poise or counterweight 79 may be slidably arranged upon said arm or lever 77 for properly balancing the parts and causing them to stand in the positions indicated in Fig. 1 of the drawings.

Figure 1:
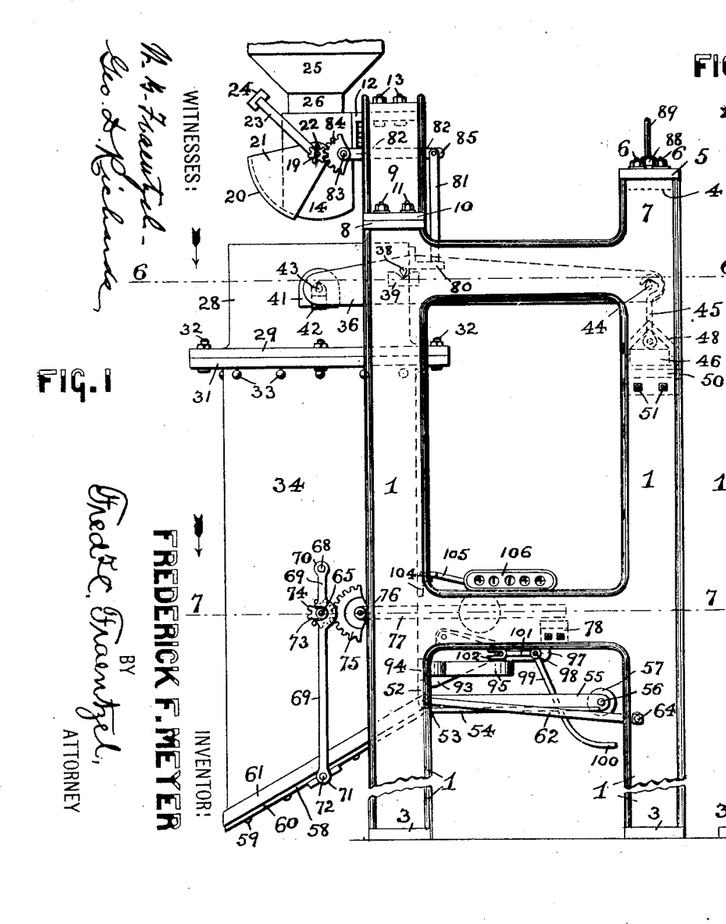
Figure 1 is a side elevation of my novel construction of automatic weighing or measuring machine embodying the leading features of my invention.
Figure 2:
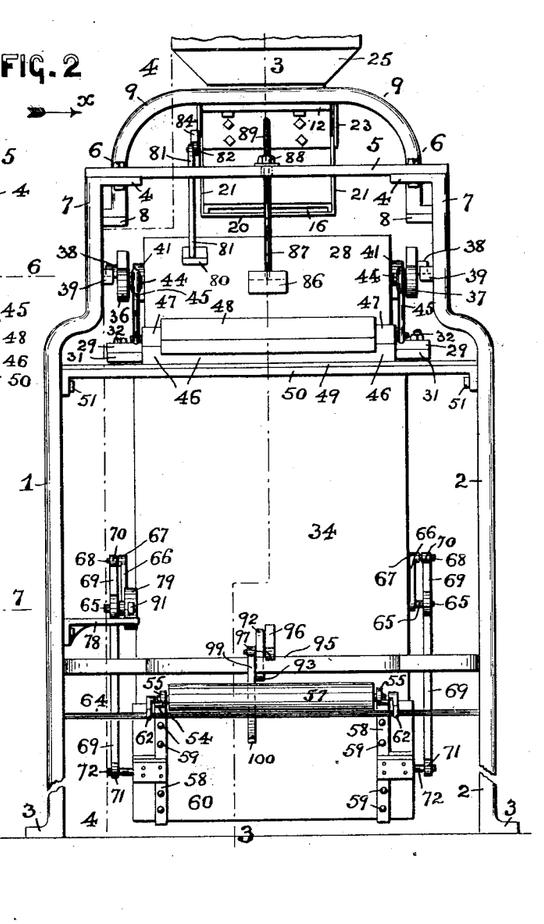
Fig. 2 is a rear view of the machine, both of said views representing the several parts of the mechanism in their initial or starting positions just prior to the admission of the grain or other matter which is to be weighed or measured.
Figure 4:
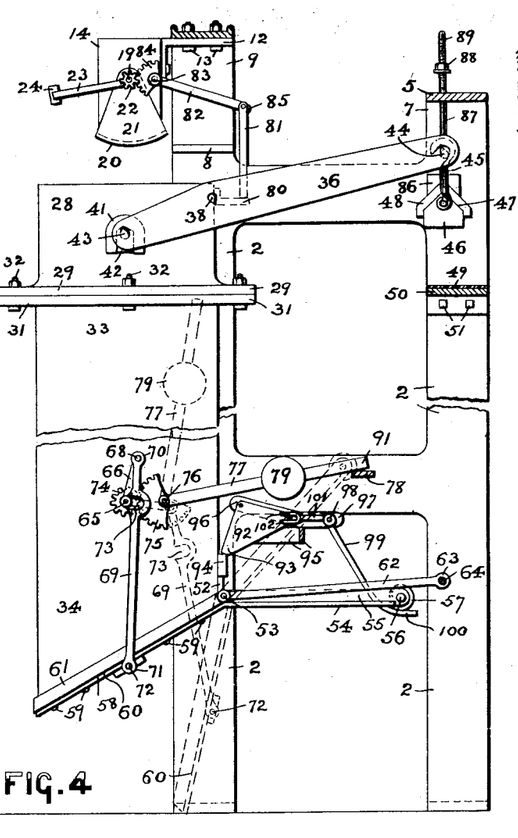
Fig. 4 is a similar section taken on line 4 4 in said Fig. 2 when looking in the direction of the arrow $x$, the several parts of the mechanism being represented in their actuated positions when the weighing or measuring receptacle has received the desired quantity of grain or other matter which is to be weighed or measured, said view also representing in dotted outline the final positions of the discharging mechanism when the weighed or measured grain is to be emptied from the weighing or measuring receptacle.
Figure 5:
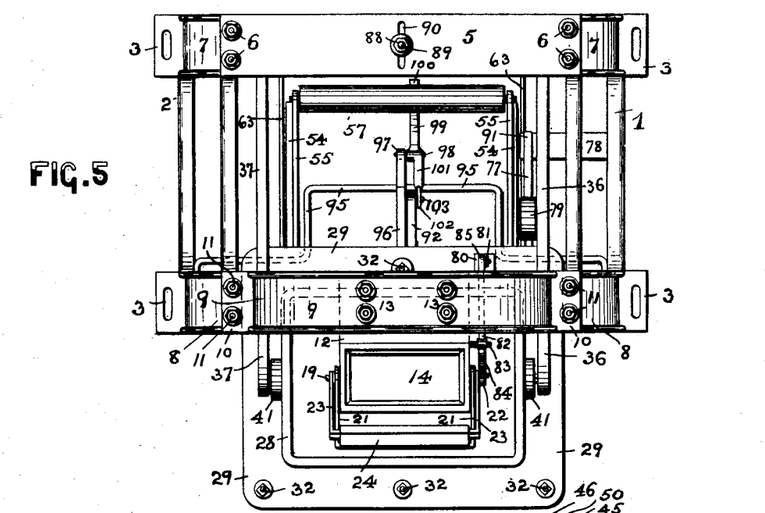
Fig. 5 is a top or plan view of the machine.
Figure 6:
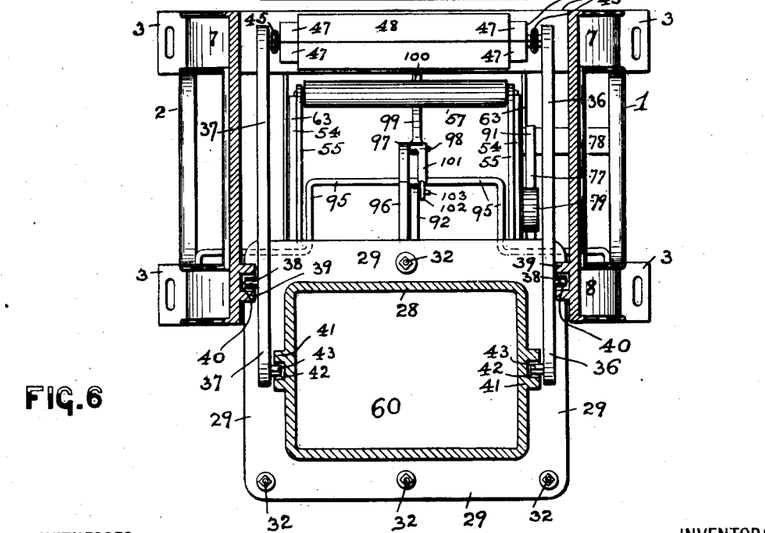
Fig. 6 is a horizontal section of the same, taken on line 6 6 in Fig. 1.

When the several parts of mechanism hereinabove described are in their initial positions just prior to the filling operation, the stirrup-shaped gate or valve 20 of the receiving-bucket 14 will be in the position represented in Figs. 1 and 3, the slide 27 in the feed-hopper 25 being closed, as shown. In order that said gate 20 may thus be held in its open relation, I have provided the upper frame 28 with a projection 80. Resting upon said projection 80 is a post 81, to which is pivotally connected the end portion 85 of a link 82. This link is operatively secured upon a pivot or pin 83 on the side of the bucket 14 and has a toothed sector 84, which meshes with the pinion 22 on one of the pins or pivots 19 of the said bucket 14, as clearly illustrated. From an inspection of Figs. 1 and 4 it will be seen that the upward vertical movement of the weighing or measuring receptacle by means of this projection 80 and the intermediately-placed levers and gearing will cause the bottom of the bucket 14 to remain open while the apparatus is inactive, or during the filling process when the slide or valve 27 in the feed-hopper 25 has been opened, and that the weight or balance 24, connected with the arms or frame 23 by gravity, will cause the closing of the bottom of the bucket 14 as soon as the weighing or measuring receptacle moves downward while being filled with the material to be weighed or measured. As soon as this receptacle has received the requisite quantity of grain or other material now being emitted from the feed-hopper 25 into the open bucket 14 the weight will cause the beams 36 and 37 to assume the positions indicated in Fig. 4, overcoming the combined weight of the poise 46 and the weight 48 on said poise. During this operation the mechanism has almost completely closed the bottom of the bucket, except a minimum part thereof, which permits what is termed a "dribble" of the material into the weighing or measuring receptacle to produce the exact weight of the material in said receptacle before it is discharged at the bottom of said receptacle. Thus the desired quantity of the material deposited in the weighing or measuring receptacle is regulated by the weight 48 of the proper denomination. During its upward movement the upper ∧-shaped surface of the weight 48 is brought in contact with the under cut and ∧-shaped surface of an auxiliary weight 86, which is suspended by means of a rod 87 and a nut 88 on a screw portion 89 of said rod from the slotted portion 90 of the cross piece or brace 5, connecting the two frames or standards 1 and 2, substantially as illustrated. By this means a slight weight is added to that of the weight 48, which permits of sufficient grain or other material to pass as dribble into the weighing or measuring receptacle before the final closing of the bucket 14 in the manner hereinabove set forth. The weight 86 is of such construction that it is taken up by the ∧-shaped surface of the main weight 48 when the beams 37 are practically in their horizontal positions. When thus taken up, the weight 86 is rigid in its relation with the weight 48, and the rod 87 moves in a perfectly-vertical plane without tilting either longitudinally or laterally in the slot 90 and without in the least bringing the screw-threads in frictional contact or resistance with any portion of the slot 90 that might retard the motion of the scale-beams. When the beams 37 return to their initial positions, the weight 86, still in its rigid position upon the weight 48, brings the rod back to its former position in the slot 90 and remains suspended at this point until the weight 86 is again taken up at the next weighing operation. The several parts of the weighing mechanism have now assumed the positions indicated in Fig. 4 of the drawings, and the free end 91 of the lever or arm 77 having been brought in engagement with the projection 78 an oscillatory motion of said rod and the toothed sector 75 on the pivot 76 is the result. This motion of the sector actuates the pinion 74, and the links 66 and 69 are thrown out of alinement. At the same time the part 73 of each link 69 is withdrawn from its position around the pivots or pins 65, whereupon the weight of the grain or other matter in the weighing or measuring receptacle being greater than the combined weight of the arms 54 and the counter weight or balance 57 will force open the gate or door 60 (the several parts assuming the positions indicated in dotted outline in said Fig. 4) and discharge the weighed or measured material into a proper receptacle, such as a bag or other package, or into a chute for delivery to other parts. As soon as the weighing or measuring receptacle has moved down the desired distance prior to the discharge of the weighed or measured material the nosing 93 of a pivotal pawl or dog 92 engages a stop 94 on the section 34, and thereby holds the parts in their lowered positions during the discharge of the grain or other material from the weighing or measuring receptacle of the machine. The said pawl or dog 92 is pivotally secured upon an arm 96, connected with a brace or piece 95, arranged between the standards of the apparatus. The said brace 95 is also provided with an arm 97, having a pivot or pin 98, on which is arranged a bell-crank comprising the two arms 99 and 101. The arm 101 has a bifurcated or similarly-constructed end 102, which fits over a pin 103, extending from the side of the pawl or dog 92, as shown, and the arm 99 is provided with a horizontally-projecting end 100. As soon as the grain or other material has been discharged from the mouth 35 in the bottom of the section 34 the counter weight or balance 57 descends and again closes the gate or door 60 against the bottom of said section 34. At the same time said weight 57 is brought down upon the end 100 of the arm 99, thereby sufficiently raising the forked arm 101 to cause the disengagement of the nosing 93 of the pawl or dog 92 from the projection 94 on said section 34. The various parts of mechanism thereupon immediately return to their initial positions (indicated more particularly in Figs. 1 and 2) and again open the bottom of the bucket 14 for refilling with a fresh supply of the grain or other material to be weighed or measured. These several operations are intermittent and automatic and continue as long as the slide 27 in the feed-hopper 25 is kept open for the intermittent supply of the material to be weighed or measured in the apparatus.

If desired the section 34 may be provided with a lug or projection 104, which during the return or upward movement of the said section engages a lever 105 of a numbering or registering device 106 to indicate the number of successive fillings or charges of the material of a given weight successively measured during a given period of time.

In Fig. 8 of the drawings I have shown another manner of employing the parts of the weighing-machine as a bag-filling machine. In this construction the lower frame 31, the section 34, and the various mechanism connected and coöperating with the section 34 are dispensed with, and in lieu of these parts the flange 29 of the upper frame 28 is provided with a suitable number of hooks or other suspension devices 107, upon which can be suspended a bag 108, which when filled can be readily removed and quickly replaced by another bag. In this construction the frame 28 has secured thereto a downwardly-extending rod 109, which is provided at or near its lower end with a cone-shaped or other suitable holding-lug 110. This lug engages with a portion of a pivoted lug or pawl 111 and holds the several parts in their lowered positions until released by an attendant placing his foot upon a releasing treadle or lever 112, and thereby throws said pawl or dog 111 out of its holding engagement with said lug 110 as soon as the filled bag has been taken from the suspension devices 107 and is replaced by an empty bag. The upward motion of the frame 28 actuates the system of levers 81 and 82 and the gear mechanism on the side of the bucket 14 in the same manner hereinabove described, thereby opening and closing the bottom of said bucket, as previously set forth.

In lieu of the auxiliary or dribble weight 86, I may provide the frame of the apparatus with a standard 113, having a bearing portion 114, in which there is a pin 115. Pivotally supported on this pin 115 is a lever device 116, comprising the parts 117 118 119 and a counterweight or balance 120. Pivotally suspended from the part 117 is a stem 121, which is engaged by the upward movement of one or both of the beam-arms of the apparatus as soon as the bag 108 has been almost filled, and thus rotates the device 116 on its pivotal support or pin 115 and throws the weight 120 beyond the central and imaginary vertical plane passing through the axial line of the pin 115. The lower portion 122 then rests directly upon the end portion 123 of the lever or arm 82 and helps, in addition to the weight 24, to fully close the bottom of the bucket 14 and prevents any further discharge of the grain or other matter from said bucket into the frame 28 and the bag suspended therefrom. The return of the frame portion 28 and the lever 82 to their initial starting-points then again causes the several parts of the device 116 to assume their normally inoperative positions. (Indicated in Fig. 8.)

From the previous description of my invention and from an inspection of the drawings it will be clearly evident that I have devised a simple and operative construction of weighing or measuring apparatus in which grain and other material are accurately weighed or measured, and the various mechanism employed embody advantages in points of simplicity, durability, and efficiency.

I am fully aware that changes may be made in the several arrangements of the mechanism as well as in the combinations of the parts without departing from the scope of my invention. Hence I do not limit my invention to the exact arrangements and combinations of the various mechanism and the several parts of the same as described in the specification and illustrated in the drawings, nor do I confine myself to the exact details of the construction of any of the parts.

Having thus described my invention, what I claim is—

1. In an automatic weghing-machine, the combination, with a weighing-receptacle, a pair of beams, and a poise, of the frame of the machine, comprising a pair of side frames provided with bearing portions for the fulcrumal support of the pair of weighing-beams, a cross-bar at the back of said machine connected with the said side frames and having a perforation, a rod slidably arranged in the perforation of said cross-bar, and means upon the upper end of said rod for suspending said rod from said cross-bar, and an auxiliary weight on the lower end of said rod in alinement with said poise on the weighing-beams and adapted to be taken up and carried by said poise during its upward movement, substantially as and for the purposes set forth.

2. In an automatic weighing-machine, the combination, with the frame and a pair of parallel weighing-beams, of a weighing-receptacle supported on knife-edges between the forward arm portions of said beams, knife-edges at the rear ends of said beams, supporting-links suspended from the knife-edges at the rear ends of said beams, a connecting-poise between said links, having a $\wedge$-shaped upper surface, a weight on said $\wedge$-shaped surface, and an auxiliary weight adapted to be taken up by said weight upon the poise during the upward movement of the said poise and weight, said auxiliary weight having a rod slidably arranged in a slotted portion of said frame, and means on said rod for suspending said auxiliary weight from the frame, when not taken up by the weight on said poise, substantially as and for the purposes set forth.

3. In an automatic weighing-machine, the combination, with a weighing-receptacle, a pair of beams, and a poise, of the frame of the machine, comprising a pair of side frames provided with bearing portions for the fulcrumal support of the pair of weighing-beams, a cross-bar at the back of said machine connected with the said side frames and having a perforation, a rod slidably arranged in the perforation of said cross-bar, and means upon the upper end of said rod for suspending said rod from said cross-bar, an auxiliary weight on the lower end of said rod in alinement with said poise on the weighing-beams and adapted to be taken up and carried by said poise during its upward movement, and a discharge-pocket for conducting the material to be weighed into said receptacle, mechanism connected with said receptacle and said discharge-pocket for closing said pocket when said receptacle has been filled, and opening the said pocket on the return movement of the said receptacle, substantially as and for the purposes set forth.

4. In an automatic weighing-machine, the combination, with a weighing-receptacle, a pair of beams, and a poise, of the frame of the machine, comprising a pair of side frames provided with bearing portions for the fulcrumal support of the pair of weighing-beams, a cross-bar at the back of said machine connected with the said side frames and having a perforation, a rod slidably arranged in the perforation of the said cross-bar, and means upon the upper end of said rod for suspending said rod from said cross-bar, an auxiliary weight on the lower end of said rod in alinement with said poise on the weighing-beams and adapted to be taken up and carried by said poise during its upward movement, and a discharge-pocket for conducting the material to be weighed into said receptacle, mechanism connected with said receptacle and said discharge-pocket for closing said pocket when said receptacle has been filled, and opening the said pocket on the return movement of the said receptacle, consisting, essentially, of pivots in the opposite sides of said pocket, side pieces 21 journaled on said pivots and a stirrup-shaped gate connected with the said side pieces, a pinion on one of said pivots, a sector in mesh with said pinion, forwardly-extending arms on said pivots, a counterbalance secured to said arms, and intermediately-arranged links between said sector and the weighing-receptacle, substantially as and for the purposes set forth.

5. In an automatic weighing-machine, the combination, with the frame of the machine provided with beam-supports, of a pair of weighing-beams having knife-edges supported in said beam-supports, a weighing-receptacle supported between said beams, a discharge-pocket for conducting the material to be weighed into said receptacle, and mechanism connected with said receptacle and said discharge-pocket for closing said pocket when said receptacle has been filled and for opening said pocket on the return movement of said receptacle, consisting, essentially, of a stirrup-shaped gate pivotally connected with said bucket, a pinion, a sector in mesh with said pinion, a counterbalance, and intermediately-arranged links between said sector and the said weighing-receptacle, knife-edges at the rear ends of said weighing-beams, supporting-links suspended from the knife-edges at the rear ends of said beams, and a connecting-poise between said links, having a ∧-shaped upper surface, and a weight on said ∧-shaped surface, and an auxiliary weight suspended above said poise and weight, adapted to be taken up by said weight upon the poise during the upward movements of said poise and weight thereon, substantially as and for the purposes set forth.

6. In an automatic weighing-machine, the combination, with the frame of the machine, of a weighing-beam supported in said frame, a weighing-receptacle, having a discharge-opening, a gate arranged over said opening, means for maintaining the closed position of said gate while said receptacle is being filled, consisting, essentially, of pins in the sides of the receptacle, a system of movable links between said pins and said gate, a pinion on one of said pins, a toothed sector in mesh with said pinion, an arm extending from said sector, and means on said machine-frame with which said arm is brought in engagement when the receptacle moves downward and thereby opens the said gate, substantially as and for the purposes set forth.

7. In an automatic weighing-machine, the combination, with the frame of the machine, of a weighing-beam supported in said frame, a weighing-receptacle, having a discharge-opening, a gate arranged over said opening, rearwardly-extending arms on said gate, a counterbalance connected with said arms, means for maintaining the closed position of said gate while the receptacle is being filled, consisting, essentially, of pins in the sides of the receptacle, a system of movable links between said pins and said gate, a pinion on one of said pins, a toothed sector in mesh with said pinion, an arm extending from said sector, and means on said machine-frame with which said arm is brought in engagement when the receptacle moves downward and thereby opens the said gate, substantially as and for the purposes set forth.

8. In an automatic weighing-machine, the combination, with the frame of the machine, of a weighing-beam supported in said frame, a weighing-receptacle, having a discharge-opening, a gate arranged over said opening, rearwardly-extending arms on said gate, a counterbalance connected with said arms, a stop on said weighing-receptacle, a pawl pivotally arranged in the machine-frame, adapted to be brought in holding engagement with said stop when said receptacle moves downward, and means in holding engagement with said pawl adapted to be engaged by the counterbalance of said gate when the weighing-receptacle has discharged its contents, to release said pawl from said stop, consisting, essentially, of a pivotally-arranged bell-crank, having one arm forked and in engagement with a pin on said pawl, and its other arm extending downwardly and having a rearwardly and horizontally extending end portion with which the said counterbalance is brought in operative engagement, substantially as and for the purposes set forth.

9. In a weighing-machine, the combination, with the frame of the machine, of a weighing-beam supported in said frame, a weighing-receptacle, having a discharge-opening, of a gate hinged over said opening, a pair of pivots or journal-pins on said receptacle, a link 66 on each pivot, and a link 69 connected with each link 66 and with a portion of the door or gate, each link 69 having a recessed portion 73 fitted around the pivots, as set forth, a pinion on one of said pins, a toothed sector in mesh with said pinion, an arm extending from said sector, and means on said machine-frame with which said arm is brought in engagement for operating said links and withdrawing them from their vertical alinement with the central axes of said pivots, substantially as and for the purposes set forth.

10. In a weighing-machine, the combination, with the frame of the machine, of a weighing-beam and weighing-receptacle having a discharge-opening, a gate and a pair of rearwardly-extending arms 54 provided with a weight, a projection 94 on said receptacle, a pawl pivotally arranged in said machine-frame, adapted by its own weight to engage said projection when the receptacle descends, and a downwardly-extending arm 99 connected with said pawl, adapted to be engaged by the said weight connected with said arms 54, for releasing said pawl from engagement with said projection 94, substantially as and for the purposes set forth.

In testimony that I claim the invention set forth above I have hereunto set my hand this 2d day of January, 1901.

FREDERICK F. MEYER.

Witnesses:
 FREDK. C. FRAENTZEL,
 GEO. D. RICHARDS.